United States Patent [19]

Cochran

[11] Patent Number: 4,638,198

[45] Date of Patent: Jan. 20, 1987

[54] ELECTRIC SUBMERGIBLE MOTOR WITH BEARING ASSEMBLY ISOLATED FROM AXIAL LOADS

[75] Inventor: Susan Cochran, Bartlesville, Okla.

[73] Assignee: TRW Inc., Cleveland, Ohio

[21] Appl. No.: 693,200

[22] Filed: Jan. 22, 1985

[51] Int. Cl.[4] .............................................. H02K 5/16
[52] U.S. Cl. .................................. 310/871; 310/157; 411/530
[58] Field of Search ................. 310/87, 112, 126, 157, 310/261; 411/353, 517, 518, 521, 530

[56] References Cited

U.S. PATENT DOCUMENTS

| Re. 28,094 | 7/1974 | Boyd | 310/90 |
|---|---|---|---|
| 1,586,184 | 5/1926 | Dick et al. | |
| 2,219,318 | 10/1940 | Hoover | 310/87 |
| 2,315,917 | 4/1943 | Arutunoff | 172/36 |
| 3,116,432 | 12/1963 | Ekey | 310/87 |
| 3,136,905 | 6/1964 | Zapf et al. | 310/87 |
| 3,218,490 | 11/1965 | Eis et al. | 310/87 |
| 3,484,633 | 12/1969 | Stecher | 310/87 |
| 3,551,714 | 12/1970 | Boyd | 310/87 |
| 4,119,874 | 10/1978 | Beavers et al. | 310/90 |
| 4,329,122 | 5/1982 | Owada et al. | 417/365 |
| 4,435,661 | 3/1984 | Witten | 310/90 |
| 4,453,099 | 6/1984 | Flat | 310/87 |
| 4,471,250 | 9/1984 | Snider | 310/67 R |
| 4,521,708 | 6/1985 | Vandevier | 310/87 |

FOREIGN PATENT DOCUMENTS 54-145901  11/1979  Japan .

Primary Examiner—Patrick R. Salce
Assistant Examiner—D. L. Rebsch
Attorney, Agent, or Firm—Shapiro and Shapiro

[57] ABSTRACT

Electric submergible motor of the long, multi-rotor section type employed for driving submergible pumps has bearing assemblies between successive rotor sections that are isolated from axial loads. For this purpose, the upper rotor section of each pair of successive rotor sections may have its lower end supported on a rotor shaft protrusion, such as a ring mounted in an annular groove of the rotor shaft. A chamfer at the end of the rotor bore locks the ring in place.

7 Claims, 1 Drawing Figure

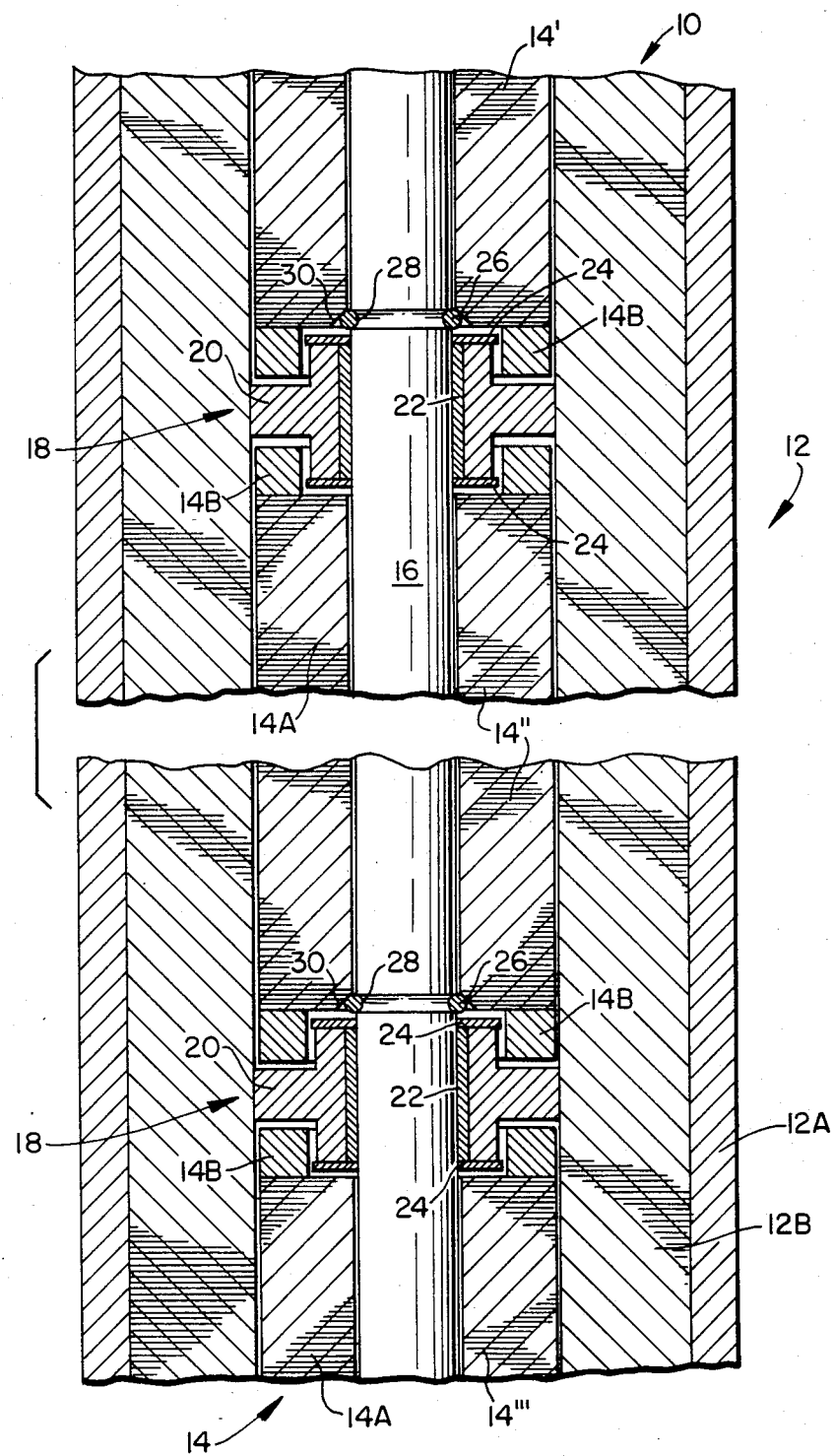

ELECTRIC SUBMERGIBLE MOTOR WITH BEARING ASSEMBLY ISOLATED FROM AXIAL LOADS

BACKGROUND OF THE INVENTION

This invention relates to electric submergible motors, particularly of the elongated, multi-section type for driving submergible centrifugal pumps, and is concerned with isolating bearing assemblies from axial loads.

In submergible motors of the type comprising a long stator and multiple rotor sections, bearing assemblies are provided between successive rotor sections. Each bearing assembly includes a stationary bearing ring and a coaxial rotatable bearing sleeve therein. Thrust washers are provided at opposite ends of the bearing assembly. The bearing sleeves and bearing rings cooperate to maintain proper air gaps between the rotor sections and the stator. The thrust washers and bearing sleeves also carry axial gravity loads from rotor section to rotor section. Conventionally, the lowermost rotor section carries the entire axial gravity load of all of the rotor sections and has its lower end supported on a thrust bearing.

The rotor sections are compelled to rotate with the rotor shaft but are capable of limited axial movement relative to the shaft. The gravity loads applied to the bearing sleeves by the rotor sections are increased by the difference in thermal expansion between the rotor sections and the rotor shaft. The total rotor weight load and additional thermal expansion load can crush thrust washers and buckle bearing sleeves. The bearing sleeves will then seize on the inside of the bearing rings, causing the bearing rings to spin with the rotor and to damage the stator. Any misalignment in assembly and any dimensional errors in this arrangement will be additive and will further decrease clearances and amplify the negative effects of thermal expansion.

It has heretofore been proposed to prevent the deformation of thrust washers by employing thrust washers that fit just over the opposite ends of the fixed bearing rings, and by employing rotatable bearing sleeves that are long enough to engage the successive rotor sections and to prevent the application of axial gravity loads to the thrust washers and the fixed bearing rings. See, for example, U.S. Pat. No. 4,453,099, issued June 5, 1984. However, it has been discovered that a problem remains in this arrangement in that thermal expansion of rotor sections may apply great enough axial loads to the rotating bearing sleeves to cause the bearing sleeves to buckle and to seize on the inside of the supposedly fixed bearing rings, forcing the bearing rings to spin with the rotor and to damage the stator.

BRIEF DESCRIPTION OF THE INVENTION

The present invention provides a solution to the foregoing problem, and provides an improved electric submergible motor, by isolating axial loads from the bearing assemblies between successive rotor sections.

More particularly, the invention is an improvement in an electric submergible motor having an elongated cylindrical stator containing an elongated cylindrical rotor, the rotor including a shaft extending axially of the motor and at least a pair of axially spaced upper and lower rotor sections coupled to the shaft for rotation therewith, but capable of limited axial movement relative thereto, and a bearing assembly disposed between the rotor sections and including a fixed bearing ring and a coaxial bearing sleeve therein rotatable with the shaft. The improvement comprises means on the rotor shaft for supporting the lower end of the upper rotor section for receiving axial loads therefrom and for preventing the exertion of such loads upon the bearing assembly. The invention will be further described in conjunction with the accompanying drawing, which illustrates a preferred (best mode) embodiment.

BRIEF DESCRIPTION OF THE DRAWING

The single FIGURE is a fragmentary vertical sectional view illustrating a portion of an electric submergible motor constructed in accordance with the invention.

DETAILED DESCRIPTION OF THE PREFERRED EMBODIMENT

Referring to the drawing, a submergible electric motor 10 in accordance with the invention comprises a long cylindrical stator 12 and a multi-section cylindrical rotor 14. The stator may comprise a casing 12A containing a stack of stator laminations 12B, and the rotor may comprise successive rotor sections 14', 14'', 14''', each including a stack of rotor laminations 14A. A long rotor shaft 16 extends along the axis of the motor and may be coupled at one end to a conventional centrifugal submergible pump (not shown). Suitable stator windings (not shown) may be provided in longitudinal slots of the stator laminations, and the rotor laminations may be joined by longitudinal rods therethrough (not shown) connected by rings 14B at the opposite ends of each rotor section. Each rotor section is fixed to the shaft for rotation therewith (as by a conventional key and slot arrangement) but is capable of limited axial movement relative to the shaft.

A bearing assembly 18 is provided between each pair of successive rotor sections for guiding the rotor shaft radially. Each bearing assembly may comprise a stationary bearing ring 20, a coaxial bearing sleeve 22 attached to the rotor shaft for rotation therewith, and a pair of thrust washers 24 at opposite ends of the bearing assembly. Except for the improvement which will now be described, the electric motor may be conventional, as disclosed, for example, in U.S. Pat. No. 2,315,917, issued Apr. 6, 1943, assigned to the assignee of the present invention, and incorporated herein by reference.

While in conventional electric submergible motors axial gravity loads are applied to the bearing assemblies between successive rotor sections, in accordance with the present invention, the bearing assemblies are isolated from axial loads, so that each rotor section performs autonomously. By virtue of the invention, transmission of axial loads to the bearing assemblies, crushing of thrust washers, and buckling of bearing rings and/or bearing sleeves, and resultant bearing failure are prevented. Dimensional errors are not additive from rotor section to rotor section, and the negative effects of thermal expansion of the rotor sections upon clearances and axial loading are eliminated. All of this is achieved, in accordance with the invention, by providing means on the rotor shaft that supports the lower end of each rotor section (but not necessarily the lowermost section) in a manner that transmits axial loads from each rotor section to the rotor shaft and prevents the exertion of such loads upon the bearing assembly beneath each rotor section.

As more particularly shown in the drawing, the purposes of the invention are achieved by providing a protrusion 26 on the shaft that engages and supports the lower end of the upper rotor section of each pair of successive rotor sections in a manner that ensures separation between that lower end and the bearing assembly beneath it. Preferably, the protrusion comprises a snap ring mounted in an annular groove 28 formed on the outer surface of the rotor shaft. The snap ring 26 may be formed of spring steel and may have a small peripheral gap (or break) to permit the ring to be expanded and slipped axially over the rotor shaft. The lower end of the rotor section supported by the snap ring may have a recess or chamfer 30 that receives the snap ring and holds it in groove 28. In one embodiment the snap ring has a 1.9" inside diameter, a 0.063" cross-sectional diameter, and a 0.37" gap (before expansion). Groove 28 has a 0.033" cross-sectional radius and a 0.034" depth. Chamfer 30 is a truncated conical surface with a base angle of 45° and a height of 0.13".

With the invention, axial thermal expansion of each rotor section supported by a snap ring 26 is principally upward, since the ring prevents significant downward expansion. Sufficient clearance is provided at the upper end of the rotor section to prevent exertion of significant axial forces on any bearing assembly above the upper end. Moreover, with the invention, the thrust washers merely serve as buffers and do not carry substantial thrust loads.

By virtue of the invention, all of the desirable features of the conventional electric submergible motor are retained, and yet, in an exceptionally simple and effective manner, damage to bearing assemblies due to axial loads is prevented.

While a preferred embodiment of the invention has been shown and described, it will be apparent to those skilled in the art that changes can be made in this embodiment without departing from the principles and spirit of the invention, the scope of which is defined in the appended claims.

I claim:

1. In a submergible electric motor having an elongated cylindrical stator containing an elongated cylindrical rotor, said rotor including a shaft extending axially of the motor and at least a pair of axially spaced upper and lower rotor sections coupled to the shaft for rotation therewith, but capable of limited axial movement relative thereto, and a bearing assembly disposed between said rotor sections and including a fixed bearing ring and a coaxial bearing sleeve therein rotatable with the shaft, said shaft extending continuously through said bearing assembly for the transmission of axial loads along said shaft without transferring said loads to said bearing assembly, the improvement comprising means on said shaft separate from said bearing sleeve for supporting the lower end of the upper rotor section, for receiving axial loads therefrom, and for preventing the exertion of such loads upon said bearing assembly, the lower end of the upper rotor section being close enough to said bearing assembly to exert axial loads on said bearing assembly during the operation of said motor in the absence of said supporting means.

2. An electric submergible motor according to claim 1, wherein said bearing assembly includes thrust washers at opposite ends thereof.

3. An electric submergible motor according to claim 1, wherein said means comprises a protrusion on said shaft.

4. An electric submergible motor according to claim 3, wherein said protrusion is a ring disposed in a groove on said shaft.

5. An electric submergible motor according to claim 4, wherein the ring is a snap ring having a peripheral break.

6. An electric submergible motor according to claim 5, wherein said lower end has a recess receiving said ring and holding said ring in said groove.

7. An electric submergible motor according to claim 4, wherein said motor includes a multiplicity of said rotor sections with successive sections separated by bearing assemblies, and includes a multiplicity of said protrusion rings, each supporting the lower end of a rotor section and preventing the exertion of axial loads upon an adjacent bearing assembly.

* * * * *